Patented May 30, 1939

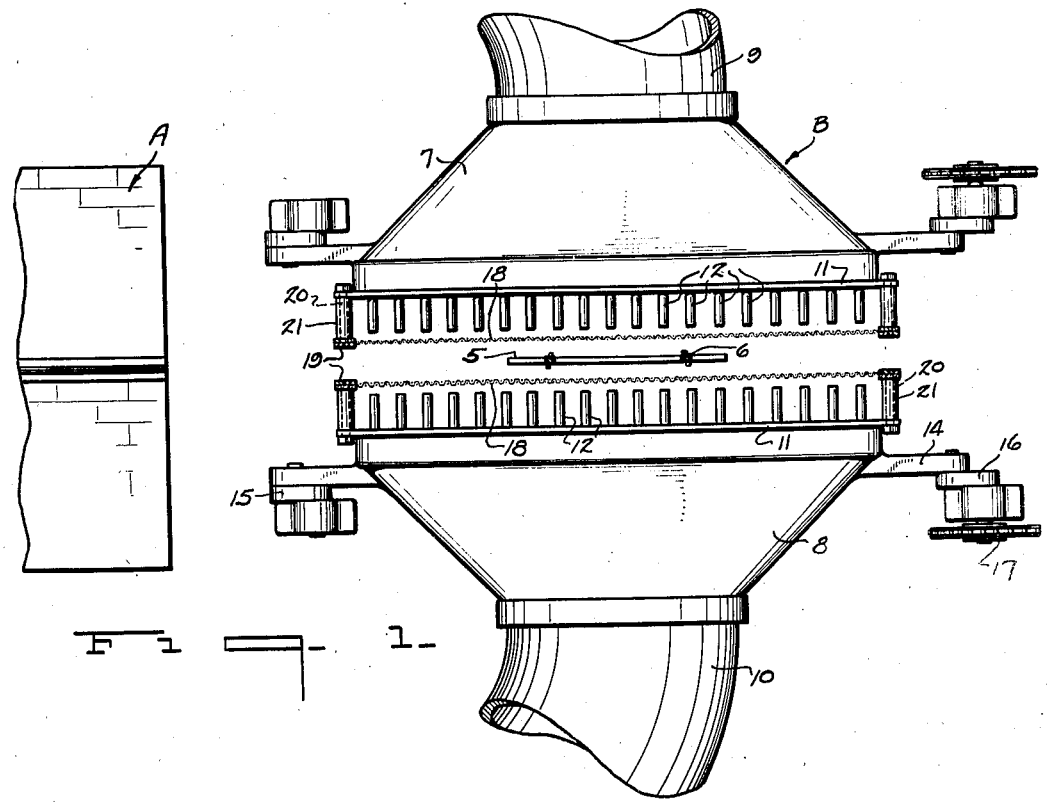
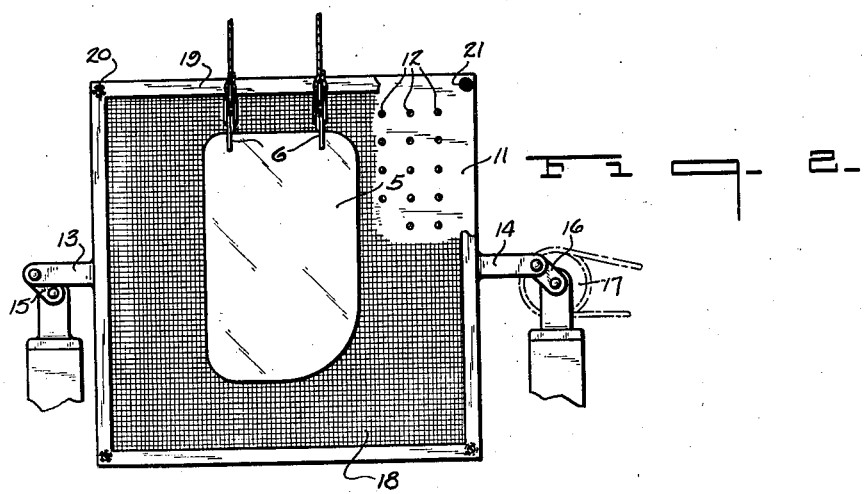

2,160,065

UNITED STATES PATENT OFFICE 2,160,065

APPARATUS FOR TEMPERING GLASS

George R. Ford, Jr., Toledo, Ohio, assignor to Libbey-Owens-Ford Glass Company, Toledo, Ohio, a corporation of Ohio Application August 19, 1937, Serial No. 159,890

6 Claims. (Cl. 49—45)

The present invention relates to improvements in apparatus for the tempering of glass sheets or plates, wherein the sheets are first heated to approximately the point of softening of the glass and then suddenly cooled to place the outer surfaces of said sheets under compression and the interiors thereof under tension.

The treatment of glass sheets in this manner not only materially increases the mechanical strength of the glass but further modifies its breaking characteristics in that if and when broken, the glass sheets will disintegrate into innumerable small and relatively harmless particles instead of breaking into large dangerous pieces or slivers as is the case with ordinary glass.

In the tempering of glass sheets according to the above process, the sheet is ordinarily maintained in a vertical position during the treatment thereof and it is customary to suspend the said sheet from a plurality of relatively small tongs or hooks engaging the same near its upper edge. The glass sheet is first heated to the desired temperature in a suitable furnace and upon removal therefrom is subjected immediately to the action of cooling means by which the glass is properly chilled. The cooling means usually employed comprises a pair of spaced blower heads between which the highly heated glass sheet is received; each blower head being provided with a plurality of metal nipples projecting towards the sheet and through which jets of air are projected against the face of said sheet. The blower heads are preferably mounted for oscillatory movement in the plane of the glass sheet to effect a more even distribution of the air over the opposite faces thereof and in consequence a more uniform cooling of the glass.

In practice, the outer ends of the nipples, carried by the blower heads, are disposed relatively close to the glass sheet and it has been found that during the cooling operation, and especially in the cooling of relatively small sheets, there is a tendency for the jets or blasts of air, impinging against the sheet, to cause it to swing back and forth as a consequence of which breakage of the sheet often-times occurs by the said sheet striking the nipples. And especially in this the case when the blower heads are being oscillated in the plane of the sheet.

This invention concerns broadly the improvement of the cooling means and has for its primary object the provision of novel means associated with the blower heads for preventing the glass sheets from striking the nipples during the cooling operation, thereby eliminating breakage of the glass from this cause while, at the same time, permitting free passage of the air.

Other objects and advantages of the invention will become more apparent during the course of the following description, when taken in connection with the accompanying drawing.

In the drawing, wherein like numerals are employed to designate like parts throughout the same, Fig. 1 is a plan view of cooling means constructed in accordance with the present invention, and Fig. 2 is a front elevation of one of the blower heads.

As brought out above, in tempering glass sheets according to the invention the said sheets are first heated to approximately the point of softening of the glass and then suddenly chilled to place the outer surfaces of the sheets under compression and the interiors thereof under tension.

In the embodiment illustrated in the drawing, the means for heating the glass sheets comprises a furnace A, while the means for cooling the same is designated in its entirety by the letter B.

The furnace A may be of any suitable construction, but is preferably of the type wherein the glass sheets are introduced into one end thereof and then passed slowly therethrough to the exit end. The furnace may be electrically heated and by means of any conventional indicating and control mechanism, the temperature therein can be regulated to heat the glass sheets as they are carried therethrough to approximately the point of softening of the glass, which is ordinarily in the neighborhood of 1250° F. for flat glass. One of the glass sheets is shown at 5 and may be suspended during heating within the furnace from a plurality of relatively small tongs or hooks 6 engaging the said sheet near its upper edge.

When the glass sheet has been heated to the desired temperature within the furnace it is removed therefrom and subjected immediately to the action of the cooling means B, which comprises the oppositely disposed blower heads 7 and 8 connected by flexible conduits 9 and 10 respectively to suitable blowers (not shown) so that blasts of air are directed simultaneously upon opposite surfaces of the glass sheet 5 when it is brought into position between the said blower heads. The inner end of each blower head is closed by a plate 11 provided with a plurality of inwardly projecting metal nipples 12 through which the jets of air are directed against the sheet.

While the blower heads 7 and 8 may be maintained stationary during the cooling operation it is preferred, in order to obtain a more uniform cooling of the glass sheets, that they be oscillated in the plane of the sheet during the chilling thereof. In order to effect this oscillatory movement of the blower heads, they may be mounted in any desired manner and, by way of example, each blower head is illustrated as being carried at its opposite sides by arms 13 and 14 connected to the revolving cranks 15 and 16 respectively, one of which may be operated by a suitable driving mechanism 17. Upon operation of the driving mechanism, the blower heads are rotated in a vertical plane, with the conduits 9 and 10 being sufficiently flexible to permit unrestricted movement of the blower heads.

As explained above, when cooling glass sheets, and especially relatively small sheets, there is a tendency for the blasts or jets of air impinging upon the sheet to cause a swinging movement thereof, with the result that the sheet striking the nipples 12 is often-times broken and it is the aim of this invention to provide means for eliminating this breakage. To this end, the nipples 12 of each blower head 7 and 8 are covered by a shield 18; said shield preferably consisting of a copper wire mesh screen carried by the respective blower head.

As shown in Fig. 2, each screen 18 is carried by a frame 19 of substantially the same shape and size as the front plate 11 of the blower head and secured thereto in any suitable manner such as by bolts 20. The screen is maintained spaced from the blower head the desired distance by sleeves 21 which encircle the bolts 20 and bear at their opposite ends against the plate 11 and frame 19 respectively. The wire screen 18 is preferably spaced slightly inwardly of the ends of the nipples 12 and will serve to effectively prevent the glass sheets from striking the said nipples and becoming broken during the blowing cycle. On the other hand, the wire screens will in no way restrict the free passage of the air, but instead will act to effect a breaking up and more uniform distribution thereof against the glass sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In apparatus for use in the tempering of glass sheets, wherein the sheet is first heated to approximately the softening point of the glass and then suddenly cooled, means for cooling the sheet including spaced blower heads for receiving the heated sheet therebetween, and a reticular guard shield arranged between each blower head and the glass sheet and out of contact with the latter for preventing the sheet from striking the blower head during the cooling operation.

2. In apparatus for use in the tempering of glass sheets, wherein the sheet is first heated to approximately the softening point of the glass and then suddenly cooled, means for cooling the sheet including spaced blower heads for receiving the heated sheet therebetween, and a reticular shield carried by each blower head for preventing the sheet from striking the same during the cooling operation.

3. In apparatus for use in the tempering of glass sheets, wherein the sheet is first heated to approximately the softening point of the glass and then suddenly cooled, means for cooling the sheet including spaced blower heads for receiving the heated sheet therebetween, and a wire mesh screen carried by each blower head and covering the inner end thereof for preventing the sheet from striking the said blower head during the cooling operation.

4. In apparatus for use in the tempering of glass sheets, wherein the sheet is first heated to approximately the softening point of the glass and then suddenly cooled, means for cooling the sheet including spaced blower heads for receiving the heated sheet therebetween, each of said blower heads comprising a plurality of nipples through which jets of air are directed against the sheet, and a reticular guard shield arranged between the nipples of each blower head and the glass sheet and out of contact with the latter for preventing the sheet from striking said nipples during the cooling operation.

5. In apparatus for use in the tempering of glass sheets, wherein the sheet is first heated to approximately the softening point of the glass and then suddenly cooled, means for cooling the sheet including spaced blower heads for receiving the heated sheet therebetween, each of said blower heads comprising a plurality of nipples through which jets of air are directed against the sheet, and a reticular shield carried by each blower head for preventing the sheet from striking said nipples during the cooling operation.

6. In apparatus for use in the tempering of glass sheets, wherein the sheet is first heated to approximately the softening point of the glass and then suddenly cooled, means for cooling the sheet including spaced blower heads for receiving the heated sheet therebetween, each of said blower heads comprising a plurality of nipples through which jets of air are directed against the sheet, and a wire mesh screen carried by each blower head and arranged in front of said nipples for preventing the sheet from striking the said nipples during the cooling operation.

GEORGE R. FORD, Jr.